United States Patent
Varadaraj et al.

(10) Patent No.: US 9,057,031 B2
(45) Date of Patent: Jun. 16, 2015

(54) CO-GASIFICATION PROCESS FOR HYDROCARBON SOLIDS AND BIOMASS

(75) Inventors: Ramesh Varadaraj, Flemington, NJ (US); John L. Robbins, Stockton, NJ (US); Michael Siskin, Westfield, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 938 days.

(21) Appl. No.: 12/586,872

(22) Filed: Sep. 29, 2009

(65) Prior Publication Data

US 2010/0083575 A1    Apr. 8, 2010

Related U.S. Application Data

(60) Provisional application No. 61/195,154, filed on Oct. 3, 2008.

(51) Int. Cl.
*C01B 3/36* (2006.01)
*C10J 3/72* (2006.01)
*C10J 3/46* (2006.01)
*C10J 3/54* (2006.01)
*C10J 3/66* (2006.01)

(52) U.S. Cl.
CPC .. *C10J 3/72* (2013.01); *C10J 3/466* (2013.01); *C10J 3/54* (2013.01); *C10J 3/66* (2013.01); *C10J 2300/092* (2013.01); *C10J 2300/0926* (2013.01); *C10J 2300/093* (2013.01); *C10J 2300/0943* (2013.01); *C10J 2300/0993* (2013.01); *C10J 2300/1884* (2013.01); *Y02E 50/32* (2013.01); *Y02T 50/678* (2013.01)

(58) Field of Classification Search
CPC ............ C10G 2/32; C10J 2300/0916; C10J 2300/1659; C10J 2300/1681; C10J 3/00; C10J 3/66; C10J 2300/092; C10J 2300/0923; C10J 2300/0926; C10L 1/04
See application file for complete search history.

(56) References Cited

U.S. PATENT DOCUMENTS

| | | | |
|---|---|---|---|
| 4,497,637 A * | 2/1985 | Purdy et al. ............... | 48/111 |
| 4,511,459 A | 4/1985 | Yan et al. | |
| 5,211,724 A * | 5/1993 | Khan et al. .............. | 48/197 R |
| 5,292,442 A * | 3/1994 | Khan et al. .............. | 210/770 |
| 5,435,940 A | 7/1995 | Doering et al. | |
| 5,685,153 A * | 11/1997 | Dickinson et al. .......... | 60/648 |
| 5,916,826 A | 6/1999 | White | |

(Continued)

OTHER PUBLICATIONS

Richard L. Bain; "Biomass Integration with Coal Gasificiation," National Renewable Energy Laboratory, EFI Heavy Resources Conference, Omni Interlocken, Denver, CO, May 10-11, 2006.

(Continued)

*Primary Examiner* — Imran Akram
(74) *Attorney, Agent, or Firm* — Bruce M. Bordelon; Chad A. Guice

(57) ABSTRACT

A process for the co-gasification of carbonaceous solids (coal, coke) and biomass in which the biomass material is pyrolyzed to provide a biomass pyrolysis oil and biomass char or coke which are then mixed with the carbonaceous solid to form a slurry. This slurry is then heated if necessary to achieve a viscosity which can be processed conveniently in the gasifier. The heat required for pyrolyzing the biomass can conveniently be obtained from the heat exchanger used to cool the hot synthesis gas product emerging from the gasifier.

15 Claims, 2 Drawing Sheets

(56) References Cited

U.S. PATENT DOCUMENTS

| | | | |
|---|---|---|---|
| 6,149,859 A * | 11/2000 | Jahnke et al. | 266/154 |
| 2003/0072705 A1 * | 4/2003 | Kindig et al. | 423/359 |
| 2008/0022595 A1 | 1/2008 | Lamaire et al. | |
| 2008/0115415 A1 * | 5/2008 | Agrawal et al. | 48/101 |
| 2008/0236043 A1 | 10/2008 | Dinjus et al. | |
| 2009/0031615 A1 * | 2/2009 | Joshi et al. | 44/307 |
| 2009/0054711 A1 * | 2/2009 | Lawrence et al. | 585/240 |
| 2009/0107046 A1 * | 4/2009 | Leininger et al. | 48/86 R |
| 2009/0305355 A1 * | 12/2009 | Henriksen et al. | 435/72 |

OTHER PUBLICATIONS

"Impact of Mineral Impurities in Solid Fuel Combustion," edited by R. P. Gupta, et al, pp. 319-331, Kluwer Academic / Plenum Publishers, New York, 1999.

For General Background (not Prior Art): R.H.A. Janssen, "Flow of Non-Newtonian Fluids in Open Channels", Bechtel Corporation, pp. 1-4. Article downioaded on Dec. 19, 2014 at http://mathsinindustry.com/wp-content/uploads/Bechtel_eqnfreesmmary_2014.pdf.

For General Background (not Prior Art): "Slurries and Non-Newtonian Fluids", pp. 1-3. Article downloaded on Dec. 19, 2014 at http://www.mflow.se/files/slurry_basics.pdf.

* cited by examiner

CO-GASIFICATION PROCESS FOR HYDROCARBON SOLIDS AND BIOMASS

This application claims the benefit of U.S. Provisional Application No. 61/195,154 filed Oct. 3, 2008.

FIELD OF THE INVENTION

The present invention relates to the production of synthesis gas by gasification of solid carbonaceous fuel sources such as coal, deasphalted bottoms, or coke and, more particularly, to the co-gasification of such fuels sources with biomass.

BACKGROUND OF THE INVENTION

Petroleum is currently estimated to account for over 35% of the world's total commercial primary energy consumption. Coal ranks second with 23% and natural gas third with 21%. The use of liquid hydrocarbon fuels on an enormous scale for transportation has led to the depletion of readily accessible petroleum reserves in politically stable regions and this, in turn, has focused attention, economically, technically and politically on the development of alternative sources of liquid fuels.

One established route to the production of hydrocarbon liquids is the gasification of carbonaceous materials followed by the conversion of the produced synthesis gas to form liquids by processes such as Fischer-Tropsch and its variants. In this way, solid fuels such as coal and coke may be converted to liquids. Coal gasification is well-established, being used in many electric power plants. Gasification can proceed from just about any organic material, including biomass, paper, plastic and rubber waste. Most importantly, in a time of unpredictable variations in the prices of electricity and fuels, gasification systems can provide a capability to operate on low-cost, widely-available coal reserves. Gasification may be one of the best ways to produce clean liquid fuels and chemical intermediates from coal as well as clean-burning hydrogen which also can be used to fuel power-generating turbines or used in the manufacture of a wide range of commercial products.

Four basic types of gasifiers are currently available for commercial use: counter-current bed, co-current bed, fluidized bed and entrained flow. In the counter-current fixed bed ("up draft") gasifier the gasification agent (steam, oxygen and/or air) flows in counter-current configuration through a descending bed of the carbon-containing fuel with the ash removed dry or as a slag. The co-current bed gasifier is similar to the counter-current type, but the gasification agent gas flows downwards in the same direction as the fuel. In the fluidized bed reactor, the fuel is fluidized in the gasification agent. In the entrained flow gasifier a dry pulverized solid, an atomized liquid fuel or a fuel slurry is gasified with oxygen or air in co-current flow and the gasification reactions take place in a dense cloud of very fine particles. Most coals are suitable for this type of gasifier because of the high operating temperatures and because the good contact achieved between the coal particles and the gasifying agent. Entrained flow gasifiers have been demonstrated as highly effective units for the gasification of coal and other carbonaceous fuels such as coke (coal derived), deasphalter bottoms and petroleum coke.

Biomass gasification is expected to play a significant role in a renewable energy economy, because biomass production removes $CO_2$ from the atmosphere and the net effect of processing the biomass has a net lower $CO_2$ generation as compared to fossil fuels. While other biofuel technologies such as biogas and biodiesel are also beneficial fuel sources for reducing carbon emissions, gasification runs on a wider variety of input materials, can be used to produce a wider variety of output fuels, and is an extremely efficient method of extracting energy from biomass. Biomass gasification is therefore one of the most technically and economically viable energy possibilities for a carbon emission constrained economy.

In power generation, the gasification of biomass exhibits the following main advantages over conventional combustion technologies:

1) Higher electrical efficiencies in the range of 22% to 37% can be achieved in gasification compared to biomass combustion technologies utilizing steam generation and steam turbines (15% to 18%).
2) There is less $CO_2$ emissions associated with the gasification than with the combustion of similar fuels.

The integration of biomass gasification in existing large coal-fired power stations is being investigated in different countries. Integration is currently more practical than stand-alone biomass gasification due to the greater flexibility in response to annual and seasonal fluctuations in biomass availability and the lower investment costs for the biomass gasification unit.

Co-gasification or co-firing of coal and biomass can be carried out via a number of processes:
Co-feeding biomass and coal to the gasifier as a mixture.
Co-feeding biomass and coal to the gasifier using separate gasifier feed systems.
Pyrolizing the biomass followed by co-feeding pyrolysis char and coal to the gasifier.
Gasifying the biomass and coal in separate gasifiers followed by a combined fuel gas clean-up.

There are, however, some drawbacks of co-firing/co-gasification of biomass and coal. Biomass has a high moisture content that results in low calorific value of the fuel, low bulk density compared to coal, low ash melting point, chemical composition with potentially high chlorine content, as well as hydrophilic and non-friable characteristics. Additionally, co-firing/co-gasification faces the possibility of decreases in overall efficiency, deposit formation (slagging and fouling), agglomeration, corrosion and/or erosion, and ash utilization. The importance of the problems depends upon the biomass/coal ratios and the quality of the biomass used as a feedstock; especially in direct co-firing systems without dedicated biomass infrastructure. During co-gasification, ash-forming species from biomass may either leave the process as bottom ash, or become released as fly ashes and flue dust. The fate of these species is dependent on their physical characteristics, the chemistry, the equipment design and the combustion conditions. These problems are further complicated by the presence of alkali metals (K, Na), alkaline earth metals (Ca, Mg), silicon, chlorine and sulphur in the ashes and can lead to reduced efficiency, capacity and availability of the facilities and therefore increased power cost.

Reburning, a combustion modification technology originally introduced by the John Zink™ Company, provides one way to integrate biomass and coal power generation minimizing the problems described above. In the reburning process, the biomass is pre-gasified and the resulting gas is used as reburn fuel in a coal-fired boiler that uses the fuel as a reducing agent to remove NOx from the combustion products. This process has the advantage of keeping undesired components, such as alkaline, chlorine, and heavy metal compounds commonly associated with biomass, away from the coal-fired boiler and, in addition, the environmental aspects of air pollution, as well as operational and economical problems, such as slagging, fouling, corrosion, and contamination of ash, are avoided. During the gasification of biomass, the solid feedstock is separated into fuel gas and a solid residue. The aim of the separate gasification of biomass is to bond the problem-causing components into the solid pyrolysis residue in order to avoid operational problems within coal-fired boilers.

With entrained flow gasifiers operating with coal-biomass mixture fuels, one problem is the delivery of the feedstock mixture of carbonaceous solids and biomass to the gasifier. Different types of entrained flow gasifiers feeding solid coal or coal-water slurries with wood chips have been reported to encounter feedstock delivery as one of the hurdles to continuous running. Failure of slurry pumps and the clogging of lock hoppers have been observed. It is therefore desirable to develop a way of feeding biomass to entrained flow gasifiers which does not suffer from these disadvantages.

SUMMARY OF THE INVENTION

We have now developed a process for the co-gasification of carbonaceous solids (such as coal and coke) and biomass which enables the biomass to be fed into the gasifier using existing types of feed transfer and feed injection equipment without encountering the delivery problems commonly associated with handling the solid bio-materials.

According to the present invention, the biomass material is pyrolyzed to provide a biomass pyrolysis oil and biomass char which are then mixed with the hydrocarbon solid to form a slurry. This slurry is then heated if necessary to achieve a viscosity which can be processed conveniently in the gasifier.

In a specific embodiment, the present invention comprehends a process for the co-gasification of solid carbonaceous particles (such as coal and coke) and biomass which comprises the steps of:
  a) pyrolyzing a biomass to provide a biomass pyrolysis oil and biomass char;
  b) mixing the biomass pyrolysis oil, biomass char and solid carbonaceous particles to form a complex plastic slurry of pumpable viscosity, suitably in the range of 1000 to 3000 cP, at temperature typically in the range of about 30° C. to 100° C.;
  c) pumping the slurry into the mixing zone of a gasifier where it is mixed with an oxygen containing gas;
  d) passing the mixture of the slurry and oxygen containing gas through a feed injector into a gasifier reactor; and
  e) gasifying the mixture.

In a preferred embodiment, the heat required for pyrolyzing the biomass can conveniently be obtained from the heat exchanger used to cool the hot synthesis gas product emerging from the gasifier.

DETAILED DESCRIPTION OF THE INVENTION

Figure 1:
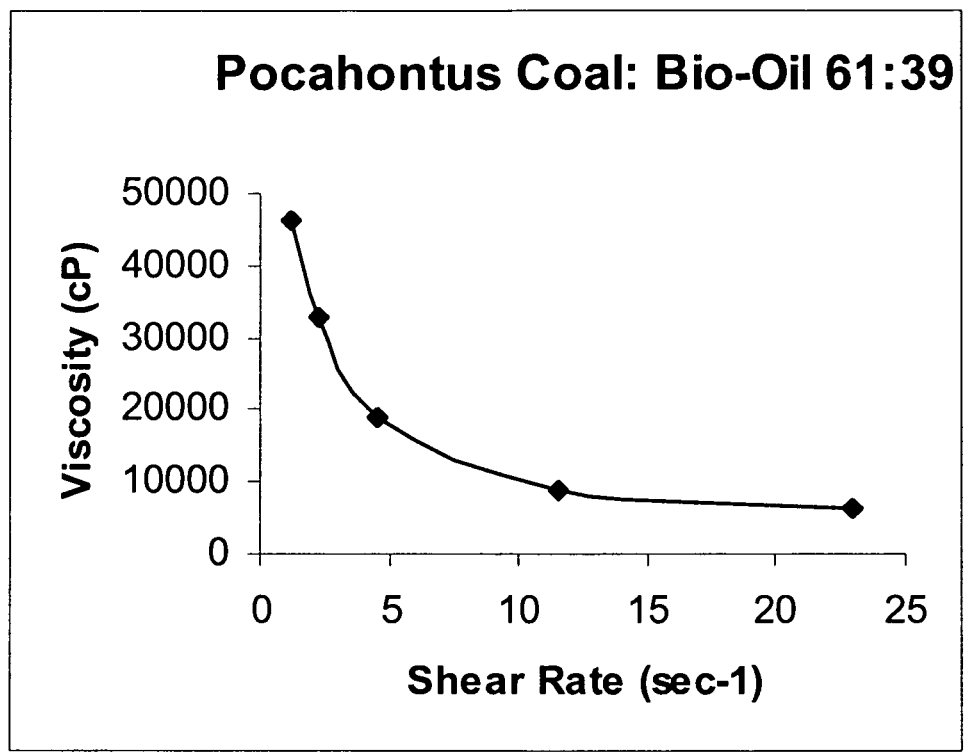
FIG. 1 is a graph relating the applied shear rate to the resulting viscosity of a slurry from the Example.

The present invention provides a route for converting carbonaceous solids, usually hydrocarbon solids, to synthesis gas which can then be used to make liquid transportation fuels such as gasoline, road diesel, aviation turbine fuels as well as lubricants. The carbonaceous solid fuel source is used in combination with biomass to secure the advantages of biomass conversion. The carbonaceous solid is preferably coal which, as noted above is the second most utilized hydrocarbon resource. However, other hydrocarbon solids such as petroleum coke (coke derived from petroleum oils), deasphalter bottoms, and coke derived from coal may also be used in the process in lieu of or in conjunction with coal.

Biomass is conventionally defined as the living and recently dead biological material that can be converted for use as fuel or for industrial production. The criterion as biomass is that the material should be recently participating in the carbon cycle so that the release of carbon in the combustion process results in no significant overall increase in $CO_2$ as averaged over a reasonably short period of time (for this reason, fossil fuels are not considered biomass by this definition as they contain carbon that has not participated in the carbon cycle for a long time so that their combustion results in a net increase in atmospheric carbon dioxide). Most commonly, biomass refers to plant matter but also includes animal matter. Most typically, biomass will be comprised of plant matter grown for use as biofuel, but it also includes discarded plant or animal matter which has been primarily used for other purposes such as production of food, production of fibers, chemical manufacturing or heat production. Biomass may also include biodegradable wastes that can be burnt as fuel including municipal wastes, green waste (the biodegradable waste comprised of garden or park waste such as grass or flower cuttings and hedge trimmings), byproducts of farming including animal manures, food processing wastes, sewage sludge, black liquor from wood pulp or algae. However, biomass excludes organic material which has been transformed by geological processes into substances such as coal or petroleum. Biomass is widely and typically grown from plants, including miscanthus, switchgrass, hemp, corn (maize), poplar, willow, sugarcane, and oil palm (palm oil). The particular plant used is not important to the product synthesis gas although the processing of the raw material for the pyrolysis step will need to be modified and the character of the slurry fed to the gasifier will also vary.

The biomass is converted in a first step by pyrolysis to a biomass pyrolysis oil and biomass char. Pyrolysis involves heating materials in a reducing atmosphere (with a limited oxygen supply), optionally with the addition of steam. In the fast pyrolysis of biomass, the material being treated is heated rapidly for only a few seconds, and this breaks it down into a large number of relatively small molecules. The resulting mixture is then cooled rapidly to prevent further reaction, giving a dark, oily liquid, known as bio-oil or pyrolysis oil. Other products include the biomass char (which is composed mostly of carbon-containing solids) as well as a mixture of gases. Both of the char and gas products can be used as fuels on site, although in the present process, the char is combined with the oil and the coal/coke to provide feed to the gasifier. Pyrolysis conditions will be selected according to the nature of the biomass but in general, temperatures from about 300 to 500° C., typically from about 350 to 425° C. will normally be used; however, provided that the requisite conversion to the pyrolysis oil is achieved, the specific pyrolysis conditions used are not important. Process economics are improved by using the heat from the heat exchanger used to cool the hot synthesis gas product emerging from the gasifier as the heat for pyrolyzing the biomass. From typical gasifiers, the effluent gas stream exits at a temperature of at least, usually from about 600 to 800° C., providing a suitable high quality heat source for the pyrolysis step.

Biomass pyrolysis liquid or bio-oil is dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash degradation of hemicellulose, cellulose and lignin in the biomass. Chemically, the oil contains several hundred different chemicals in widely varying proportions, ranging from formaldehyde and acetic acid to complex high molecular weight phenols, anhydrosugars and other oligosaccharides. It has a distinctive odor from low molecular weight aldehydes and acids and is an irritant.

The biomass pyrolysis liquid (also referred to herein as the equivalent term "bio-oil") contains varying quantities of water, which forms a stable single phase mixture, ranging from about 15 wt % to an upper limit of about 30-50 wt % water, depending on how it was produced and subsequently collected. Pyrolysis liquids can tolerate the addition of some water, but there is a limit to the amount of water which can be added to the liquid before phase separation occurs. In other words, the liquid cannot be substantially dissolved in water. It is miscible with polar solvents such as methanol, acetone, etc., but highly immiscible with petroleum-derived fuels. The pyrolysis liquid contains many reactive species. Pyrolysis liquids cannot be completely vaporised once they have been recovered from the vapor phase. If the liquid is heated to 100° C. or more in attempts to remove water (typically about 25% as produced) or to distill off lighter fractions, it rapidly reacts and eventually produces a solid residue of around 50 wt % of the original liquid and some distillate containing volatile organic compounds and water.

Bio-oil, although referred to as an oil, will not mix homogeneously with any hydrocarbon liquids, it can be considered as a micro-emulsion in which the continuous phase is an aqueous solution of holocellulose decomposition products that stabilize the discontinuous phase of pyrolytic lignin macro-molecules through mechanisms such as hydrogen bonding. Aging or instability is believed to result from a breakdown in this emulsion. The viscosity of the bio-oil as produced can vary from as low as 25 centistokes (cSt) to as high as 1000 cSt (measured at 40° C.) or more depending on the feedstock, the water content of the oil, the amount of light ends that have been collected and the extent to which the oil has aged.

Fast pyrolysis bio-oil has a higher heating value of about 17 MJ/kg as produced with the water that cannot readily be separated. The density of the liquid is very high at around 1.2 kg/liter compared to light fuel oil which has a density of around 0.85 kg/liter. This equates to about 42% of the energy content of diesel or fuel oil on a weight basis, but 61% of the energy content of diesel or fuel oil on a volumetric basis. Some characteristics of a typical wood-derived bio-oil are summarised in Table 1 below.

TABLE 1

| Property | Typical value |
| --- | --- |
| Moisture content | 20-30% |
| pH | 2.5 |
| Specific gravity | 1.20 |
| Elemental analysis | |
| C | 55-58% |
| H | 5.5-7.0% |
| O | 35-40% |
| N | 0-0.2% |
| Ash | 0-0.2% |

TABLE 1-continued

| Property | Typical value |
| --- | --- |
| HHV as produced | 16-19 MJ/kg |
| Viscosity (40° C., 25% water) | 40-100 cp |
| Solids (char) | 0.1-0.5% |
| Vacuum distillation residue | up to 50% |

The pyrolysis is carried out in the conventional manner with fast pyrolysis preferred for high liquid yield, characterized by rapid heating of the biomass particles and a short residence time of product vapors (0.5 to 2 seconds). Rapid heating implies that it is preferable for the biomass to be ground into fine particles and that the insulating char layer that forms at the surface of the reacting particles is continuously removed.

Pyrolysis is slightly endothermic and various methods have been proposed to provide heat to the reacting biomass particles, but the preferred method is circulating fluidized beds: biomass particles are introduced into a circulating fluidized bed of hot sand, coke or other solid particles. Gas, solid particles and biomass particles move together, with the transport gas usually being a recirculated product gas, although it may also be a combustion gas. High heat transfer rates from the solid particles ensure rapid heating of biomass particles and ablation is stronger than with regular fluidized beds. A fast separator separates the product gases and vapors from the solid particles and char particles. The solid particles are reheated in a fluidized burner vessel and recycled to the reactor.

Alternative methods that may be considered for use for the pyrolysis include the auger feed/reactor technology for coal gasification, the ablative processes in which biomass particles are moved at high speed against a hot metal surface, and the rotating cone process in which pre-heated hot solids particles and biomass particles are introduced into a rotating cone. In this last method, due to the rotation of the cone, the mixture of solids particles and biomass is transported across the cone surface by centrifugal force. Like other shallow transported-bed reactors relatively fine particles are required to obtain a good liquid yield although none appear to be as commercially practical as the circulating fluidized bed.

The product mixture from the pyrolysis step may be used as such without further processing by blending the biomass pyrolysis oil with the biomass char (if separated from the oil) and the carbonaceous fuel. Based on the recognition that low molecular weight hetero-atom containing molecules such as pyridine can swell coal, the polar oxygenated species of the biomass pyrolysis oil may be effective to swell the coal to form a plastic material which is then further transformed into a plastic slurry by the water present in the biomass pyrolysis oil. Thus, a complex plastic slurry can be formed. It may be more difficult to form a slurry of this type with fuel sources with low hydrogen content such as coke and for this reason, coal is the preferred hydrocarbon fuel for the present invention. The coal may be of any rank suitable for gasification and this may be lignite, sub-bituminous, bituminous or even anthracite. To form a slurry in the selected oil, the coal/coke will preferably be reduced to an average particle size (by weight) from about 0.01 millimeters (mm) to about 10 mm, and even more preferably in most cases, and average particle size from about 0.05 to about 5 mm. Conventional slurrying techniques and equipment may be utilized. The ratio of solids (coal/coke plus char) and oil is selected to provide a complex plastic slurry of the pyrolysis biomass oil, the biomass char and the carbonaceous material which can be handled readily and fed into the gasifier. In preferred embodiments of the present invention, the ratio (wt/wt) of coal/coke to bio-oil will be from about 80:20 to about 20:80, and even more preferably from about 60:40 to about 40:60.

If needed, the slurry is heated to a temperature to render it readily pumpable although in most cases, depending on the temperature of the coal/coke and of the oil, a suitable temperature will require little or no heating. Slurry temperatures of 20 to 100° C., preferably 30 to 100° C., are suitable with the upper limit set by the point at which degradation of the bio oil to solid products becomes troublesome with its consequences for slurry viscosity. The final slurry viscosity will preferably be in the range of 500 to 5000 centipoise (cP), more preferably from 1000 to 300 cP, and most preferably from 1500 to 2500 cP, which at these consistencies, the slurry will be amenable to handling using conventional pumping equipment.

Additional fuel sources may be added to the slurry if desired, for example, waste polymer materials such as the polyolefins, mainly polyethylene or polypropylene, polyesters, polyamides or even such waste materials as rubber tires and dried sewage sludge. In all such cases, the amount of the additional fuel source should be controlled so as to maintain the viscosity of the slurry at a suitable value for pumping. Normally, the amount of added fuel material will not exceed 10 wt. percent of the total slurry.

Conventional slurry pumps with proven performance can be used to pump the plastic slurry to the mixing zone. In the mixing zone oxygen or air is mixed with the plastic slurry and then fed into the gasifier through a feed injector assembly that will be capable of atomizing the incoming feed.

Gasification may be carried out in the conventional manner with steam co-feed according to the feed composition to generate the desired synthesis gas. As described above, the heat from the effluent gas of the gasifier may be used for the pyrolysis of the biomass. Additives to modify the properties of the gasification ash may be added to the slurry as it is fed into the gasifier. For example, the ash fusion temperature (AFT) may be controlled by adding AFT increasing minerals to the coal slurry before it is fed into the gasification process. Acidic materials such as silica ($SiO_2$), alumina ($Al_2O_3$) and titania ($TiO_2$) may be used for this purpose as well as, for example, kaolinite, dolomite, CW clay (a kaolinite and silimanite rich clay), DV clay (a kaolinite and quartz rich clay), gibbsite, bauxite and other materials containing mainly $Al_2O_3$ and $SiO_2$ as well as other mineral additives such as gypsum. Other additives may be used to control the gasification process, for example, compounds which will catalytically facilitate the gasification of the feed into synthesis gas, such as potassium, calcium, sodium, or magnesium carbonates, bicarbonates, hydroxides, cresylates or sulfates, individually or in combination, as described for instance in U.S. Pat. No. 5,435,940. The effect of various materials on the gasification process is described by Gupta et al in *Impact of Mineral Impurities in Solid Fuel Combustion*, 1999—Technology & Engineering.

EXAMPLE

Figure 2:
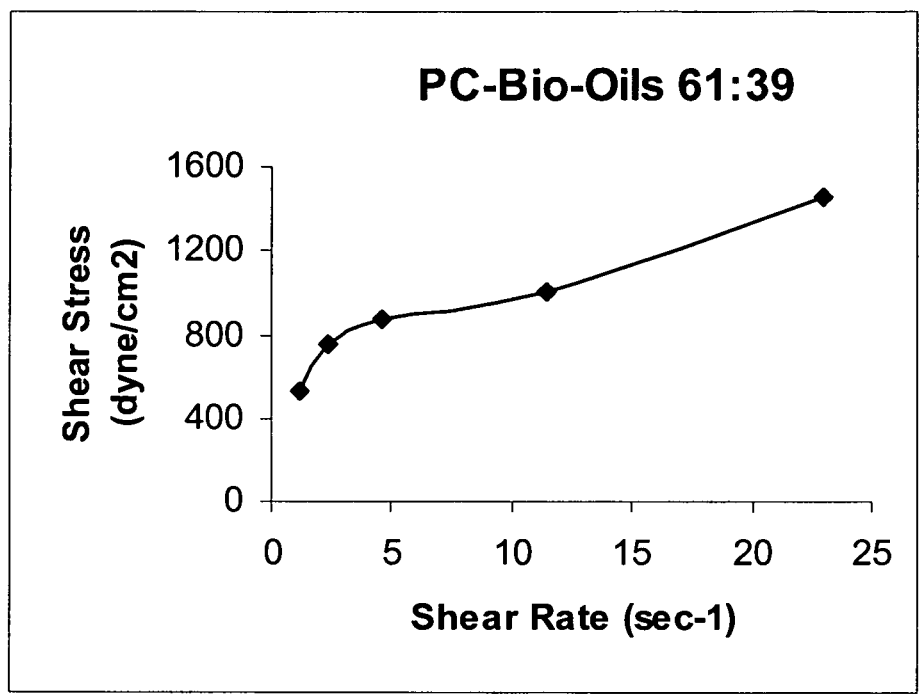
FIG. 2 is a graph relating the stress to strain of a slurry from the Example.

Experiments using biomass oil and coal were conducted. Pocahontas (bituminous) coal and pyrolysis bio-oil derived from pyrolysis of wood chips (from Biomass Technology Group™, Netherlands) were used to form slurries at a 61:39 wt/wt ratio (coal/bio-oil) which were evaluated for their rheological properties. The data shown in FIGS. 1 and 2 show that the slurries were strongly shear thinning and plastic with a viscosity of 6339 cP at 22.5 $s^{-1}$ and a plastic yield stress of 0.477 $N \cdot m^{-1}$ (477 dynes/cm$^2$).

What is claimed is:

1. A process for forming a slurry feed for the gasification to synthesis gas of solid carbonaceous particles and solid biomass, comprising:
   pyrolyzing the biomass to form biomass pyrolysis oil and biomass char; and
   mixing the biomass pyrolysis oil and biomass char with the solid carbonaceous particles to form the slurry feed, the slurry feed comprising a plastic slurry, the solid carbonaceous particles having an average particle size by weight of about 0.01 mm to about 10 mm,
   wherein the ratio of the solid carbonaceous particles to biomass pyrolysis oil is from 60:40 to 40:60 by weight, and the viscosity of the slurry feed is from 500 to 5000 centipoise (cP).

2. The process according to claim 1, wherein solid carbonaceous particles comprise a solid fossil fuel.

3. The process according to claim 2, wherein solid carbonaceous particles comprise coal.

4. The process according to claim 1, wherein the solid carbonaceous particles are comprised of a coke derived from coal or a coke derived from petroleum oil.

5. The process according to claim 1, wherein the biomass comprises biological matter selected from wood, plant matter, municipal waste, green waste, byproducts of farming or food processing waste, sewage sludge, black liquor from wood pulp, and algae.

6. A slurry feed for gasification to synthesis gas comprising a complex plastic slurry which is a mixture of a solid carbonaceous particles, biomass pyrolysis oil and biomass char, the solid carbonaceous particles having an average particle size by weight of about 0.01 mm to about 1.0 mm,
   wherein the ratio of the solid carbonaceous particles to biomass pyrolysis oil is from 60:40 to 40:60 by weight, and the viscosity of the slurry feed is from 500 to 5000 centipoise (cP).

7. The slurry feed according to claim 6, wherein the solid carbonaceous particles are comprised of a coke derived from coal or a coke derived from petroleum oil.

8. The slurry feed according to claim 6, wherein the biomass pyrolysis oil is comprised of biological matter selected from wood, plant matter, municipal waste, green waste, byproducts of farming or food processing waste, sewage sludge, black liquor from wood pulp, and algae.

9. A process for the co-gasification of solid carbonaceous particles and a biomass, which comprises:
   a) pyrolyzing a biomass to provide a biomass pyrolysis oil and biomass char;
   b) mixing the biomass pyrolysis oil, the biomass char and solid carbonaceous particles to form a complex plastic slurry of pumpable viscosity, the solid carbonaceous particles having an average particle size by weight of about 0.01 mm to about 10 mm;
   c) pumping the complex plastic slurry into the mixing zone of a gasifier where it is mixed with an oxygen-containing gas;
   d) passing the mixture of the complex plastic slurry and oxygen-containing gas through a feed injector into a gasifier reactor; and
   e) gasifying the mixture to form synthesis gas,
   wherein the ratio of the solid carbonaceous particles to biomass pyrolysis oil is from 60:40 to 40:60 by weight, and the viscosity of the complex plastic slurry is from 500 to 5000 centipoise (cP).

10. The process according to claim 9, wherein the viscosity of the complex plastic slurry is in the range of about 1000 to 3000 cP at a temperature in the range of from about 30 to 100° C.

11. The process according to claim 9, wherein the solid carbonaceous particles are comprised of a solid fossil fuel.

12. The process according to claim 11, wherein the solid carbonaceous particles are comprised of coal.

13. The process according to claim 9, wherein in the solid carbonaceous particles are comprised of a coke derived from coal or a coke derived from petroleum oil.

14. The process according to claim 9, wherein the biomass comprises biological matter selected from wood, plant matter, municipal waste, green waste, byproducts of farming or food processing waste, sewage sludge, black liquor from wood pulp, and algae.

15. A process according to claim 9, wherein steam is co-fed into the gasifier reactor with the mixture of complex plastic slurry and oxygen-containing gas.

* * * * *